United States Patent [19]
Johnson et al.

[11] Patent Number: 6,033,737
[45] Date of Patent: Mar. 7, 2000

[54] EMBOSSABLE WATER BASED VINYL CHLORIDE POLYMER LAMINATE

[75] Inventors: Jay A. Johnson, Spartanburg, S.C.; Marten S. Callicott, Columbus, Miss.; Richard W. Davis, Covington, Ga.; Daniel C. Gottschalk, Columbus, Miss.; Joseph L. Pate, Columbus, Miss.; Joe A. Wright, Starkville, Miss.

[73] Assignee: OMNOVA Solutions Inc., Fairlawn, Ohio

[21] Appl. No.: 09/022,796

[22] Filed: Feb. 13, 1998

[51] Int. Cl.⁷ ............................ B05D 3/00; B32B 27/08
[52] U.S. Cl. ................ 427/385.5; 428/482; 428/483; 428/904.4
[58] Field of Search .................... 428/482, 483, 428/904.4; 427/385.5

[56] References Cited

U.S. PATENT DOCUMENTS

| | | |
|---|---|---|
| 4,066,820 | 1/1978 | Kelly et al. . |
| 4,478,907 | 10/1984 | Van Gossum et al. . |
| 4,603,074 | 7/1986 | Pate et al. . |
| 4,888,381 | 12/1989 | Pankratz . |
| 4,962,139 | 10/1990 | Lo ........................................... 523/468 |
| 4,981,730 | 1/1991 | Zaleski . |
| 5,017,216 | 5/1991 | Petroff et al. . |
| 5,374,691 | 12/1994 | Hintze-Brüning et al. . |
| 5,449,706 | 9/1995 | Iwase et al. . |
| 5,466,535 | 11/1995 | Higgins et al. . |

OTHER PUBLICATIONS

Article in Journal of Cellular Plastics; Mar. 1, 1973, vol. 9, pp. 99–102; Published by Technomic Publishing Co., formerly in Westport, CT, now in Lancaster, PA.

Two pages of a Product Brochure re MASIL® Silicone Surfactants; Published between 1993 and 1995; PPG Industries, Pittsburgh, PA.

Product Data Sheet for K–Flex® 188 and Formulating Guide for K–FLEX®; According to Richard Shain (Sales Dev. Mgr., King, Ind.) this information was generally published over the period of 1983 to 1990. His phone No. is (203) 866–5551 or (800) 431–7900; Printed and distributed by King Industries, Norwalk, CT.

*Primary Examiner*—Tae Yoon
*Attorney, Agent, or Firm*—Robert F. Rywalski; Daniel J. Hudak

[57] ABSTRACT

A compounded and plasticized vinyl chloride polymer layer, optionally supported with a fabric, contains an outer adherent, stain resistant layer having durability and flexibility. The adherent, stain resistant layer is derived from a water-based polyester-amino resin composition. The stain resistant layer comprises the reaction product of said polyester, an acid catalyst, and an amino resin. The vinyl chloride layer may be printed or embossed or both printed and embossed, optionally printed again, before the outer layer is applied. A laminate formed from the polyvinyl chloride polymer layer and the stain resistant layer can also be embossed.

3 Claims, No Drawings

EMBOSSABLE WATER BASED VINYL CHLORIDE POLYMER LAMINATE

FIELD OF INVENTION

A vinyl chloride polymer layer is coated with the reaction product of a polyester resin and an amino resin to provide a laminate with improved stain resistance. The coating is distinguished from prior coatings in that it uses water and other relatively non-hazardous solvents.

BACKGROUND OF INVENTION

Plasticized vinyl chloride polymers are widely used as wall coverings, upholstery material and related uses. The plasticizer in the vinyl chloride polymers (PVC) make them soft and pliable. However the plasticizers also make it easier to abrade (scuff) the PVC and to stain or discolor the PVC. Thus it is desirable to coat plasticized PVC compositions (wallpaper and upholstery materials) with a scuff resistant and stain resistant coating.

U.S. Pat. No. 4,603,074 to GenCorp discloses a reaction product of a polyester and an amino resin as a flexible stain resistant layer for PVC laminates. However Example I of the patent illustrated that the coating included about 43 wt. % methyl ethyl ketone. It would be desirable to have a coating with similar properties but that is free of certain solvents considered harmful to the environment.

SUMMARY OF INVENTION

According to the present invention, a layer of a plasticized flexible vinyl chloride polymer is coated with a water based polyester-amino resin composition and heated to cure and adhere the resin to the vinyl chloride polymer (PVC) layer with removal of the solvent. This provides a flexible vinyl chloride polymer layer with a coating which is stain resistant and which can readily be cleaned to remove stains. Prior to the discovery of this coating, it was generally accepted theory by those skilled in the art that an organic solvent based coating was necessary to provide the required stain barrier and abrasion resistance.

A vinyl chloride polymer plastisol can be coated and fused or a plasticized vinyl chloride polymer composition can be calendered or extruded to form the PVC layer. They may be applied to a substrate or support. In either case the vinyl chloride polymer layer (about 1 to 30 or 100 mils thick, thicker coatings are usually expanded PVC) can be printed one or more times. The PVC layer can be embossed, before and/or after printing, or embossed after the application of coating. After the optional printing step, the PVC layer can be coated with a layer of water based polyester-amino resin composition and cured to provide the vinyl chloride polymer layer with an outer stain resistant layer about 0.1 to 2 mils thick. The water-based solvent comprising water, isopropanol and propylene glycol n-propyl ether facilitates compliance with the federal Clean Air Act and its amendments as compared to solvent based coatings including methyl ethyl ketone and methyl isobutyl ketone.

DISCUSSION OF DETAILS AND PREFERRED EMBODIMENTS

The vinyl chloride polymer (PVC) can be an emulsion (plastisol grade) or a suspension grade vinyl chloride polymer. Vinyl chloride polymer and polyvinyl chloride are alternate ways to refer to a polymer made by the polymerization of vinyl chloride monomer. The vinyl chloride polymer can be homopolyvinyl chloride (preferred) or a copolymer of a major amount by weight (e.g. at least 90 wt. %) of repeat units from vinyl chloride and a minor amount by weight of repeat units from a copolymerizable monomer preferably selected from the group consisting of vinyl acetate, vinylidene chloride and maleic ester. Bulk and solution vinyl chloride polymers, also, may be used. Mixtures of vinyl chloride polymers can be used. Vinyl chloride polymers and copolymers are well known. In this connection please see "Vinyl and Related Polymers," Schildknecht, John Wiley & Sons, Inc., N.Y., 1952; Sarvetnick, "Polyvinyl Chloride," Van Nostrand Reinhold Company, N.Y. 1969; Sarvetnick, "Plastisols and Organosols," Van Nostrand Reinhold Company, N.Y., 1972 and "Modern Plastics Encyclopedia 1980–1981," Oct., 1980, Volume 57, No. 10A, McGraw-Hill Inc., N.Y.

The amount of plasticizer used to plasticize the vinyl chloride polymer to make it flexible may vary from about 20 or 30 to about 100 parts by weight parts per 100 parts by weight of total vinyl chloride polymer resin more desirably from about 20 or 30 to about 50 or 60 parts by weight for wallcovering applications and preferably from about 60 to about 100 parts by weight for upholstery type applications per 100 parts by weight of total vinyl chloride polymer resin. Generally any conventional PVC plasticizer can be used. Examples of plasticizers which may be used are butyl octyl phthalate, dioctyl phthalate, hexyl decyl phthalate, dihexyl phthalate, diisooctyl phthalate, dicapryl adipate, dioctyl sebacate, trioctyl trimellitate, triisooctyl trimellitate, triisononyl trimellitate, isodecyl diphenyl phosphate, tricresyl phosphate, cresyl diphenyl phosphate, polymeric plasticizers, epoxidized soybean oil, octyl epoxy tallate, isooctyl epoxy tallate and so forth. Mixtures of plasticizers may be used.

Other conventional vinyl chloride polymer compounding ingredients are desirably incorporated in the vinyl chloride polymer compositions. Examples of such ingredients are the silicas such as precipitated silica, fumed colloidal silica, calcium silicate and the like; calcium carbonate; ultra violet light absorbers; fungicides; carbon black; barytes; barium-cadmium-zinc stabilizers; barium-cadmium stabilizers; tin stabilizers; dibasic lead phosphite; $Sb_2O_3$; zinc borate and so forth and mixtures of the same. $TiO_2$, red iron oxide, phthalocyanine blue or green or other color pigments can be used. The pigments and the other dry additives preferably are dispersed or dissolved in one or more plasticizers before adding to the plasticized vinyl chloride polymer compositions. These compounding ingredients are used in effective amounts to control color, mildew, stabilization, viscosity and so forth of the plasticized vinyl chloride polymer.

The vinyl chloride polymer composition may contain suitable blowing or foaming agents such as sodium bicarbonate, and the organic agents like 1,1-azobisformamide, 4,4-oxybis (benzene sulfonylhydrazide), p-toluenesulfonyl hydrazide and so forth to form a cellular or foamed vinyl chloride polymer composition layer or sheet on fusing. The blowing agents may require an activator. Such blowing agents are well known.

Vinyl chloride polymer blending or extender resins, also, can be used in the compositions in a minor amount by weight as compared to the vinyl chloride polymer composition.

The ingredients forming the vinyl chloride polymer composition may be charged to and mixed together in any one of several mixinc devices such as a Ross Planetary mixer, Hobart dough type mixer, Banbury, 2-roll rubber mill, Nauta mixer and ribbon blender and so forth.

The vinyl chloride polymer composition can be formed into layers or films which can be unsupported or supported (preferred). Where a vinyl chloride polymer plastisol composition is used, it may be cast on a release surface and heated to fuse it to form a film. Where a plasticized suspension grade vinyl chloride polymer composition is used, it can be calendered or extruded and fused to form a film. Temperatures may vary from about 200 to about 400° F. (93 to 204° C.). However, it is preferred in many embodiments that the compounded vinyl chloride polymer composition be supported or have a backing. In the case of the supported vinyl chloride polymer composition, the substrate can be a woven fabric (drill, scrim, cheesecloth, and so forth), a knit fabric, a non-woven fabric, paper, etc. The fabric can be made of cotton, cellulose, nylon, polyester, aramid, polyolefin, rayon or acrylic fibers or cords or mixtures of the same. It may be necessary in some instances to treat the fabric with an adhesive coating or dip to adhere or to adhere better the fabric to the vinyl chloride polymer composition.

The vinyl chloride polymer composition film or layer, supported or unsupported, is preferably printed on the surface of the vinyl chloride polymer, opposite the backing if any, with a suitable vinyl chloride polymer receptive ink to form desirable and novel patterns and designs. Such inks are well known and can be applied by various methods of printing such as by gravure, flexography, screen printing, jet printing, web printing and so forth. See "Modern Plastics Encyclopedia 1980–1981," pages 464–465. The printing operation may be repeated for up to five times or more to vary the colors and designs and is generally carried out at temperatures of desirably from about 150 to about 65° F. (66 to 74° C.) for each printing step.

The vinyl chloride polymer composition film or layer, supported or unsupported, printed or unprinted, is preferably embossed to texture the vinyl chloride layer to provide a pattern or design for esthetic or functional purposes. The embossing step can precede or follow the application of the coating. Embossing of thermoplastic films, layers or sheets is well known and is usually carried out by passing the film between an embossing roll and a backup roll under controlled preheating and post-cooling conditions. See "Modern Plastics Encyclopedia 1980–1981," pages 454–45. Additional decorating or printing can sometimes be done with the above described inks over the embossed vinyl chloride polymer surface for better aesthetic purposes.

The water-based polyester-amino resin composition for use as the outer or top coating on the vinyl chloride polymer layer is prepared from a solution of a reactive polyester and an amino resin in an water-based solvent desirably comprising or consisting essentially of water, an alcohol having from 1 to 8 carbon atoms, and an alkylene glycol alkyl ether. The term consisting essentially of is used to exclude major amounts (eg. greater than 1, 2, 5, or 10 wt. % based on the final coating composition with solvents) of certain solvent such as ketones having from 3 to 15 carbon atoms such as methyl ethyl ketone (MEK) and methyl isobutyl ketone (MIBK), tetrahydrofuran (THF), esters of less than 200 molecular weight, aromatic and naphthenic solvents, dimethylformamide (DMF), dimethylsulfoxide (DMSO) and chlorinated and/or fluorinated solvents. These certain solvents, to be limited or excluded, generally have greater solvency for hydrocarbon polymers than water, alcohols, and alkylene glycol alkyl ethers. These certain solvents include many solvents on the Air Toxics List (HAP) of the amendment of 1990 to Federal Clear Air Act.

Desirably the water-based polyester-amino resin composition before or after catalyst addition comprises from about 0 or 10 to about 30 wt. % water, from about 10 or 15 to about 30 wt. % alkylene glycol alkyl ether, from about 10 to about 25 or 30 wt. % alcohol (desirably monohydric), from about 10 to about 25 wt. % amino resin, from about 10 or 15 to about 35 wt. % polyester resin, from about 0 or 0.1 to about 5 wt. % silica (desirably fumed), and from about 0 or 0.25 or 0.5 to about 1.5 or 5 wt. % silicone glycol or other slip agent. More desirably the composition comprises from about 15 to about 25 wt. % water, from about 15 to about 25 wt. % alkylene glycol alkyl ether, from about 10 to about 20 wt. % alcohol, from about 12.5 or 14 to about 18 or 20 wt % amino resin, from about 20 to about 28 or 30 wt. % polyester, from about 14 to about 18 wt. % amino resin from about 0 to about 5 wt. % of framed silica and from about 0 or 0.25 or 0.5 to about 1.5 wt. % silicone glycol.

A short time before the above composition is applied, an acid catalyst for the polyester reaction with amino resin is added. The amount of acid catalyst on a 100% active basis is desirably from about 1.4 to about 2.8 parts by weight per 100 parts by weight of polyester amino resin composition, more desirably from about 1.7 to about 2.5 parts by weight. These amounts of catalyst can also be from about 1.4 to about 2.8 wt. % of the composition, more desirably from about 1.7 to about 2.5 wt. %. A preferred catalyst is methane sulfonic acid available as a 70 percent active solution in water or another solvent although other sulfonic acids can be used.

The alcohol can be any monohydric alcohol desirably having from 1 to 6 or 8 carbon atoms, more desirably from about 1 to 4 carbon atoms and preferably from 2 to 3 carbon atoms. The alkylene glycol alkyl ether can have from 3 to 10 carbon atoms and the alkylene can have from 2 to 5 carbon atoms and the alkyl from 1 to 5 carbon atoms. The alkylene glycol alkyl ether is particularly useful as it evaporates after the alcohol and water and thereby acts as a coalescing aid for the film. The silicone glycols have the generic formula

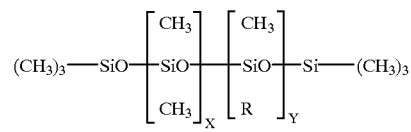

Where R is defined as —(O)$_N$—(CH$_2$—CH$_2$—O)$_P$—(CH$_2$—CH—[CH$_3$]—O)$_Q$—R$^1$ where R$^1$ is H or an alkyl of 1–6 carbon atoms, N is 0 or 1, P is from 0 to 20, Q is from 0 to 20, the sum of P and Q must be at least 1, X is from 1 to 20, and Y is from 1 to 20. Note that the oxygen atom between the silicone oil and alkylene oxide may be present or absent. Note also that the alkylene oxide can be ethylene oxide, propylene oxide or random combinations thereof.

The water-based polyester-amino resin composition may be applied to the vinyl chloride polymer film directly, with or without the backing or substrate, with or without the printing steps and with or without the embossing step(s). It is preferred that the catalyzed water-based polyester-amino resin composition be applied to a printed, compounded and plasticized vinyl chloride polymer film carried on a suitable backing or substrate. The catalyzed water-based polyester-amino resin composition is usually stored at near ambient conditions (20–30° C.). The plasticized vinyl chloride film can be at about 20–30° C. when the polyester-amino resin composition is applied or at some higher or intermediate processing temperature used for printing or calendering. Preferably, for cost reasons, the embossing step is performed after the coating has been applied.

The polyester resins are made by a condensation polymerization reaction, usually with heat in the presence of a catalyst, or a mixture of a polybasic acid and a polyhydic alcohol (polyol). Exemplary acids to form the alkyd resin or reactive polyester are adipic acid, glutaric acid, succinic acid, azelaic acid, sebacic acid, terephthalic acid and phthalic anhydride and so forth. Examples of some polybasic alcohols to use are ethylene glycol, propylene glycol, diethylene glycol, dipropylene glycol, glycerine, butylene glycol, 2,2-dimethyl-1,3-propanediol, trimethylol propane, 1,4-cyclohexanedimethanol, pentaerythritol, trimethylolethane and the like. Desirably at least 95 mole % of the acid and 95 mole % of the polyol components are saturated. Desirably at least 95 mole % of the polyol components are bis(hydroxymethyl) cyclohexane. Desirably the polyol component is essentially free of (e.g. <1 mole %) of polymeric glycols having a molecular weight from 300 to 1000. Desirably the polyol component has less than 10 mole % polyol components having from 2 to 4 carbon atoms. Preferably at least 95 mole % of the acid component comprises aliphatic dicarboxylic acids having from 4 to 8 carbon atoms. Polyesters of these diacids and diols have good solubility in the water based solvent systems and form stain resistant, abrasion resistant films. A preferred polyester is K-flex 188 from King Industries which according to U.S. Pat. No. 5,449,706 is the condensation product of a mixture of C4-C8 straight chain dicarboxylic acids and bis (hydroxymethyl) cyclohexane and has a molecular weight around 435. Mixtures of polyols and polycarboxylic acids can be used. Mixtures of these reactive polyester or alkyd resins can be used. Alkyd resins are well known as shown by the "Encyclopedia of Polymer Science and Technology," Vol. 1, 1964, John Wiley & Sons, Inc., pages 663–734; "Alkyd Resins," Martens, Reinhold Publishing Corporation, N.Y., 1961 and "Alkyd Resin Technology," Patton, Interscience Publishers, a division of John Wiley and Sons, N.Y., 1962. Some unsaturated polybasic acids and unsaturated polyols may be used in the condensation reaction but are generally undesirable. The reactive polyester or alkyd resin is usually added to the amino resin while dissolved or suspended in a water-based solvent as previously described.

Desirably the polyester resin has a hydroxyl number (expressed as mg of KOH per gram of polyester) of from about 150 to about 300 or 325 and more desirably from about 200 or 220 to about 300. Desirably it has an acid number from about 0 to about 35 or 50 and preferably from about 0 to about 1, 5 or 10. Desirably it has a number average molecular weight from about 200 to about 1500, more desirably from about 300 to about 700 or 1000. Polyesters meeting the hydroxyl number and acid number values that are capable of working with the solvent system include K-Flex 188 from King Industries, Chempol 11-2339 from CCP, and SCD 18263 from Etna.

The amino resin to be reacted with the reactive polyester is an alkylated benzoguanamine-formaldehyde, alkylated urea-formaldehyde or, preferably, an alkylated melamine-formaldehyde resin. Mixtures of these resins can be used. The alcohol used to modify the benzoguanamine-formaldehyde, urea-formaldehyde or melamine-formaldehyde resin can be n-butanol, n-propanol, isopropanol, ethanol or methanol and so forth. These amino resins are well known. Please see "Amino-plastics, " Vale et al, Iliffe Books Ltd., London, 1964; "Amino Resins," Blair, Reinhold Publishing Corporation, N.Y., 1959, "Modemn Plastics Encyclopedia 1980–1981," pages 15, 16 and 25 and "Encyclopedia of Polymer Science And Technology," John Wiley & Sons, Inc., Vol. 2, 1965, pages 1 to 94.

Desirably the ratio of the reactive groups on the polyester resin to the reactive groups on the amino resin are comparable to those in the examples. Such ratios assure that the degree of cross-linking is comparable to that in the coatings of the examples, i.e. low enough to be soft enough to flex but high enough to be stain and scuff resistant. The number of reactive groups can be calculated by dividing the weight of the polyester or amino resin by its equivalent weight (molecular weight divided by the number of reactive groups per molecule). The equivalent weight for the polyester and amino resin components can be calculated and used to estimate the amount (by weight) of each needed. One can quickly screen additional polyesters and amino resins at a comparable level of cross-linking. If either stain resistance or flexibility is lacking, then the formula can be adjusted to change the level of cross-linking to enhance the deficient property at the expense of the adequate property.

The polyester and amino resins are more soluble in the alkanol and the alkylene glycol ether than in the water. Thus the amount of polyester and amino resin in a coating composition can be increased slightly by increasing the alkanol or alkylene glycol alkyl ether ratio to water. The ratio of alkylene glycol alkyl ether to alkanol can vary widely as their effect on the solvent system is comparable.

Sufficient amounts by weight of the reactive polyester and amino resin are employed to provide a stain resistant, layer having good durability and flexibility and having good adhesion to the compounded and plasticized vinyl chloride polymer layer on curing and cross-linking. These materials are cured at temperatures of at least 200° F. (93° C.) for effective times in the presence of a minor amount by weight of an acidic catalyst like methylsulfonic acid (preferred), boric acid, phosphoric acid, acid sulfates, hydrochlorides, phthalic anhydride or acid, oxalic acid or its ammonium salts, sodium or barium ethyl sulfates, aromatic sulfonic acids such as p-toluene sulfonic acid and the like. Prior to curing, flatting agents or other additives can be added to the mixture of the reactive polyester and amino resin.

The stain resistant laminates of the present invention are particularly useful as wallcoverings, especially for hospitals. However, these stain resistant laminates, also can be used in the manufacture of tablecloths, shoe uppers, luggage exteriors, upholstery, vehicle interiors and seats, single plv roofing membrane, golf bags and other sporting goods and so forth.

EXAMPLES

The following examples will serve to illustrate the present invention with more particularity to those skilled in the art.

A polyvinyl chloride (PVC) wallcovering including plasticizer, stabilizer and other compounding agents was prepared with an appropriate backing. Next the PVC layer was printed. Separate samples of the printed PVC film were then gravure finish roll coated with two different solutions of a reactive polyester (KE is a solvent based coating including MIBK and MEK; and KW is a water based coating including isopropanol and propylene glycol propyl ether) and an amino resin and cured at about 200° F. to remove the solvent and to form a stain resistant, cross-linked and adherent layer of about 0.5 mil thick on the printed PVC layer. These coated wall coverings can be and often were embossed after coating.

| COATING KE | |
|---|---|
| Ingredients | Weight % |
| Reactive polyester resin (80% resin, 20% solvent (mixture of methyl isobutyl ketone and n-butyl acetate)). The polyester was the condensation reaction product of 2,2-dimethyl-1,3-propanediol, 1,4-cyclohexane dimethanol, trimethylol propane, phthalic anhydride and adipic acid and contained active hydrogen atoms (—COOH groups). | 35.0 |
| Liquid hexamethoxymethyl melamine | 13.8 |
| p-Toluene sulfonic acid in isopropanol (40% acid, 60% alkanol) | 4.4 |
| Silica gel flatting agent | 3.8–4.3 |
| Methyl ethyl ketone | 42.5–43 |

*Coating KE is equivalent to the examples in U.S. Pat. No. 4,603,074

| COATING KW | | |
|---|---|---|
| | Dull Finish | Bright Finish |
| | 97 wt. % First Component | 97 wt. % First Component |
| Water | 19.08 | 20.83 |
| Propylene glycol n-propyl Ether | 21.26 | 23.21 |
| n-Propanol | 14.16 | 15.46 |
| Methylated melamine Formaldehyde resin | 16.00 | 16.00 |
| K-flex 188 ™ * | 24.00 | 24.00 |
| Amorphous fumed silica | 5.00 | 0.0 |
| Silicone glycol** | 0.50 | 0.50 |
| | 3 wt. % Second Component | 3 wt. % Second Component |
| Methylsulfonic acid | 70 wt % | 70 wt % |
| Water | 30 wt % | 30 wt % |

*K-flex ™ 188 is a polyester described more fully in the specification.
**Masil 1066 D available from BASF Corp Gurnee, Ill.

The coated polyvinyl chloride substrate was marked/stained with the following materials, Markers, Pens, Crayons, Lipstick, Shoe polish, Mustard, Ketchup, Betadine, Motor oil, Nail polish, and Spray paint. After air drying and remaining on the coated PVC for 1 hour, the mark/stain was cleaned and the results were recorded in Table I. The process used to clean the PVC coated with coating KE involved three or fewer steps. Only the first two cleaning steps were required to clean the PVC coated with coating KW. As cleaning step 3 actually removes a portion of coatings KE and KW, it was desired to avoid step 3. Step 1 uses 409™ cleaning solution with a soft brush or cloth. Step 2 uses isopropyl alcohol with a soft brush or cloth. Step 3 uses acetone with a soft brush or cloth.

TABLE I

| Stain Removal Test | | |
|---|---|---|
| | KE COATING | KW COATING |
| Markers (Carter) | | |
| Black | None | None |
| Blue | None | None |
| Red | Ghost | None |
| Pens (Bic) | | |
| Black | None | None |
| Blue | None | None |
| Red | None | None |
| Crayons (Crayola) | | |
| Black | None | None |
| Red | None | None |
| Lipstick (Revlon) | | |
| Love that Red | None | None |
| Shoe polish (Kiwi) | | |
| Liquid | None | None |
| Solid | Noticeable | None |
| Nail polish (Revlon) | | |
| Love that Red | Ghost | None |
| Other Stains | | |
| Mustard (French's) | Ghost | None |
| Ketchup (Hunt's) | None | None |
| Betadine | None | None |
| Motor oil | None | None |
| Spray paint (Krylon) | None | None |

None: No stain
Ghost: Barely visible stain
Noticeable: Vision stain

The coated polyvinyl chloride substrates were also tested according to Volkswagen Seatbelt Abrasion Test Method and the W-Flex Test Method CFFA-10. Both the KE and KW coatings exceeded the requirement of at least 500 cycles on the Volkswagen Seatbelt Abrasion Test Method. In this method the coated PVC is mounted on a 17 inch diameter drum that is cycled through a small arc while a conventional fixed automobile seatbelt is in contact with the coated PVC. Good lubricity and wear resistance are needed to pass this test.

The KE coating routinely passes a 10,000 cycle test in the W-Flex test. The KW coating went through 25,000 cycles without failure in a recent test. Thus, the KW coating can easily pass the W-Flex test. The W-Flex test measures the flexibility of a coating and resistance to delamination.

The above tests indicate that the water based polyester-amino resin composition (which is free of solvents listed in the Clean Air Act as hazardous air pollutants (HAP)) has very desirable reductions in release of certain chemicals along with good stain release and/or cleanability. The coating is very abrasion resistant even after exposure to water and polar solvents such as isopropanol and acetone. The prior art coatings of U.S. Pat. No. 4,603,074 hereby incorporated by reference had good stain resistance and cleanability because the polyester component was less soluble in things like polar low molecular weight alcohols and water (carriers for some stains). The achievement of comparable cleanability and abrasion resistance of a water based coating was unexpected. Due to the favorable interaction (solubility) of the polyester in water, alcohols, and alkylene glycol alkyl ether and possibly the coalescing effect of the akylene glycol alkyl ether, the coating has good flexibility, good stain resistance and good abrasion resistance. Usually cleanability is associated with a barrier type behavior of the coating. Abrasion resistance is usually associated with a relatively hard coating that is not softened or swollen by the cleaning media.

While in accordance with the patent statutes the best mode and preferred embodiment have been set forth, the scope of the invention is not limited thereto, but rather by the scope of the attached claims.

What is claimed is:

1. A method for coating a printed surface of a plasticized vinyl chloride polymer layer optionally having an embossed surface, comprising;
    a) applying a coating composition to said polymer layer,
    b) evaporating at least a portion of said solvent system, and
    c) concurrently and/or subsequently to evaporating, cross-linking said coating composition at an elevated temperature wherein said coating composition comprises:
    1) a solvent system consisting essentially of water, one or more alkyl alcohols of 1 to 8 carbon atoms, and one or more alkylene glycol alkyl ethers,
    2) an amino resin cross-linking agent being alkylated benzoguanamine, alkylated urea, or alkylated melamine fomaldehyde resin, or combinations thereof, and an acid catalyst therefore,
    3) a polyester resin miscible with said solvent system and said amino resin, which is capable of being cross-linked by said amino resin cross-linking agent and said acid catalyst, and
    4) optionally a silicone glycol and wherein at least 90 mole % of the dicarboxylic acids of said polyester are saturated dicarboxylic acids, at least 95 mole percent of said acids are straight chain carboxylic acids having from 4 to 8 carbon atoms, and at least 95 mole percent of the polyol of said polyester is bis(hydroxymethyl) cyclohexane.

2. A method according to claim 1, wherein said water is present from about 10 to about 30 wt. %, said one or more alkyl alcohols are present from about 10 to about 15 wt. %, and said one or more alkylene glycol alkyl ethers are present from about 10 to about 30 wt. % based upon the total weight of said composition.

3. A method according to claim 1, wherein said polyester has a number average molecular weight about 200 to about 1500.

* * * * *